United States Patent
Per et al.

(10) Patent No.: US 10,915,347 B1
(45) Date of Patent: Feb. 9, 2021

(54) SYSTEM AND METHOD FOR PLATFORM-INDEPENDENT MIGRATION AND REPLICATION OF COMPUTER SYSTEMS

(71) Applicants: Yuri Per, Moscow Region (RU); Serguei M. Beloussov, Costa del Sol (SG); Vladimir Miroshkin, Moscow (RU); Stanislav Protasov, Moscow (RU); Maxim V. Lyadvinsky, Moscow (RU)

(72) Inventors: Yuri Per, Moscow Region (RU); Serguei M. Beloussov, Costa del Sol (SG); Vladimir Miroshkin, Moscow (RU); Stanislav Protasov, Moscow (RU); Maxim V. Lyadvinsky, Moscow (RU)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 0 days.

(21) Appl. No.: 14/502,060

(22) Filed: Sep. 30, 2014

(51) Int. Cl.
 *G06F 9/445* (2018.01)
 *G06F 9/455* (2018.01)

(52) U.S. Cl.
 CPC ...... *G06F 9/45558* (2013.01); *G06F 9/44505* (2013.01); *G06F 2009/4557* (2013.01)

(58) Field of Classification Search
 CPC ............. G06F 9/45558; G06F 9/44505; G06F 2009/4557
 See application file for complete search history.

(56) References Cited

U.S. PATENT DOCUMENTS

| | | | |
|---|---|---|---|
| 6,920,555 B1 * | 7/2005 | Peters | G06F 9/4451 711/173 |
| 7,047,380 B2 | 5/2006 | Tormasov et al. | |

(Continued)

OTHER PUBLICATIONS

Galan et al. Autoconfiguration of Enterprise-class Application Deployment in Virtualized Infrastructure Using OVF Activation Mechanisms. [online] (Oct. 26, 2012). IEEE., pp. 414-421. Retrieved From the Internet <http://ieeexplore.ieee.org/xpls/abs_all.jsp?arnumber=6380050&tag=1>.*

(Continued)

*Primary Examiner* — Emerson C Puente
*Assistant Examiner* — Jonathan R Labud
(74) *Attorney, Agent, or Firm* — K&L Gates LLP

(57) ABSTRACT

Systems and methods for migrating and/or replicating computer systems are disclosed. Computer systems may be migrated and/or replicated from physical systems or virtual systems to physical or virtual systems. Migrating/replicating computer systems comprises determining the structure of the source computer system, generating instructions for migrating/replicating the structure of the computer system, and packaging the instructions in an executable package. The instructions may be formatted as a template, such as an OVF template, and be packaged with an executable agent and task list. The executable agent may be received and executed by a destination computer system. Executing the executable package may cause the instructions to be executed, as well as the optional agent, there configuring the destination computer system, possibly copying data present on the source computer system, and possibly rebooting the destination computer system.

22 Claims, 7 Drawing Sheets

(56) References Cited

U.S. PATENT DOCUMENTS

| | | | |
|---|---|---|---|
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 9,069,607 B1* | 6/2015 | Gopalakrishna Alevoor ............ G06F 9/45558 |
| 2006/0225065 A1 | 10/2006 | Chandhok et al. |
| 2007/0294676 A1* | 12/2007 | Mellor ................ G06F 8/65 717/139 |
| 2010/0011178 A1 | 1/2010 | Feathergill |
| 2010/0275251 A1* | 10/2010 | Gross ................ H04L 63/062 726/6 |
| 2011/0107330 A1* | 5/2011 | Freundlich ........ G06F 9/45558 718/1 |
| 2013/0290542 A1* | 10/2013 | Watt .............. H04L 29/08153 709/226 |

OTHER PUBLICATIONS

Landmann et al. Red Hat Enterprise Linux 6 Installation Guide. [online] Red Hat, Inc., pp. i-xx and 1-528. Retrieved From the Internet <ftp://122.252.236.67/Linux%20OS/redhat/rhel6.1_32bit/Red_Hat_Enterprise_Linux-6-Installation_Guide-en-US.pdf> (Year: 2010).*

* cited by examiner

SYSTEM AND METHOD FOR PLATFORM-INDEPENDENT MIGRATION AND REPLICATION OF COMPUTER SYSTEMS

TECHNICAL FIELD

The technical field may generally relate to migration or replication of computer systems, and more particularly to migration or replication of computer systems to virtual environments.

BACKGROUND

A computer system may be migrated and/or replicated for a variety of reasons. In some cases, the computer system may be migrated to move the computer system to a different platform, such as for instance an upgraded platform. In other cases, the computer system may be deployed to multiple computer systems to provide a uniform system for multiple users. In other cases, the computer system may need to be recovered after infection by a virus or a system failure, such as a hard drive crash. The computer system may be migrated/replicated from a physical system to another physical system or to a virtual system. The computer system may be migrated/replicated from a virtual system to a physical system or to another virtual system.

In some situations, migration/replicating may be limited to identical source and destination systems. Migration/replication may further require privileged access to the destination system. In addition, migration/replication may require manual configuration of the destination system, including possibly starting a virtual machine, configuring physical and/or virtual disks, and/or installing an operating system. The migration/replication process may be interrupted by networking disconnects, necessitating restarting the process, possibly from the beginning.

Migrating and/or replicating computer systems can therefore be facilitated by processes that are platform-independent, capable of being automated, and able to restart on network disconnects. Such processes may further provide robustness by, for example, providing facilities to validate the migrated/replicated system.

BRIEF SUMMARY

In an embodiment, a computer-implemented method for preparing a computer system for migration or replication may include determining, by a processor, the structure of the computer system. The method may further include generating, by the processor, instructions for migrating or replicating the structure of the computer system. The method may also include packaging, by the processor, the instructions in an executable package.

One or more of the following features may be included. The method may include generating, by the processor, instructions for locating and copying data files from the computer system.

In an implementation, the instructions may include a template of the computer system, and the template is packaged with an agent and a task list. The template may be an Open Virtualization Format (OVF) template or a Preboot eXecution Environment (PXE) package. The task list may include instructions for locating and copying data files from the computer system. The task list may further include instructions for rebooting the computer system.

In an embodiment, a computer-implemented method for replicating a computer system may include receiving, by a processor, an executable package containing instructions for migrating or replicating the structure of the computer system. The method may further include receiving, by a processor, an executable package containing instructions for migrating or replicating the structure of the computer system. The method may additionally include executing, by the processor, the executable package, wherein the executable package causes each of the instructions to be executed, wherein the instructions migrate or replicate a structure of the computer system.

In an implementation, the instructions may include instructions for locating and copying data files from the computer system. The executable package may further be executed by an operating system. The executable package may additionally or alternatively be executed by a boot process. The instructions may comprise a template of the computer system, and the executable package may include an agent and a task list. The template may be an OVF or a PXE package.

One or more of the following features may be included. The method may include launching, by the processor, a virtual machine according to the template of the computer system. The method may further include executing, by the processor, the agent, wherein the agent executes the task list.

In an implementation, the task list may include tasks for locating and copying the data files from the computer system. The task list may also include tasks for rebooting the virtual machine.

In an embodiment, a system for migrating or replicating a computer system may include a first computer system. The first computer system may be configured to determine the structure of a third computer system. The first computer system may further be configured to generate instructions for migrating or replicating the structure of the third computer system. The first computer system may also be configured to package the instructions in an executable package. The system may further include a second computer system. The second computer system may be configured to receive the executable package. The second computer system may also be configured to execute the executable package, wherein the executable package causes each of the instructions to be executed, and wherein the instructions migrate or replicate the structure of the third computer system.

In an implementation, the instructions may include instructions for locating and copying data files from the third computer system. The second computer system may execute the executable package through an operating system. The second computer system may additionally or alternatively execute the executable package through a boot process. The instructions may comprise a template of the computer system, and the executable package may include an agent and a task list. The second computer system may be further configured to launch a virtual machine according to the template of the computer system. The second computer system may further be configured to execute the agent, wherein the agent executes the task list. The task list may include tasks for locating and copying data files from the third computer system. The task list may also include tasks for rebooting the virtual machine.

In an embodiment, a method for platform-independent migration and/or replication of computing machines to virtual environments is disclosed. The method includes connecting a client application to an image storage device. The method further includes selecting an image of a computing machine to be migrated from the image storage. The method further includes requesting a seed, template, or structure of the selected computing machine for target platform. The method further includes determining the configuration of one or more structures of the computing machine in the selected image, using template generator; and using this configuration creates a seed, template or structure.

In an implementation, the method further includes opening a boot disk of the created seed, using the template generator, and activating a migration agent. The process of activating the migration agent may include deploying the migration agent, and registering it as a boot loader to be started on boot. The process may further include adding a task that contains information about the image storage (such as a hostname, a port, and/or credentials or a certificate to access the image storage). The process may additionally include mapping disk partitions in the image and on the target machine, and some additional options (such as validation after migration steps, and/or reattempts settings).

In an implementation, the method further includes uploading a created seed, template or other predicate used to create the computing machine on the target platform, using, for example, a virtualizations system to import the computing machine. The method may further include running a computing machine created from the seed, template or predicate.

In an implementation, a BIOS/UEFI may run a migration agent that is registered as boot loader. The migration agent may read the task list and perform operations from the task list.

In an implementation, the method performs one or more steps to migrate a computing machine. The steps may include establishing a connection to a specified storage using, using the certificate or credentials from the task list. The steps may further include copying data from an image located on the image storage to disks of the computing machine according to the mapping specified in the task list. The migration process may perform additional operations, such as validation of the migrating computing machine, patching of the operating system, and/or adding one or more hardware or software drivers. The migration process may further reboot the migrated computing machine, and boot to the recovered operating system.

In an implementation, the created seed may be uploaded to the target platform using import functionality, for example the import functionality provided by a vSphere client.

The details of one or more implementations are set forth in the accompanying drawings and the description below. Other features and advantages will become apparent from the description, the drawings, and the claims.

DETAILED DESCRIPTION

Overview

Figure 1:
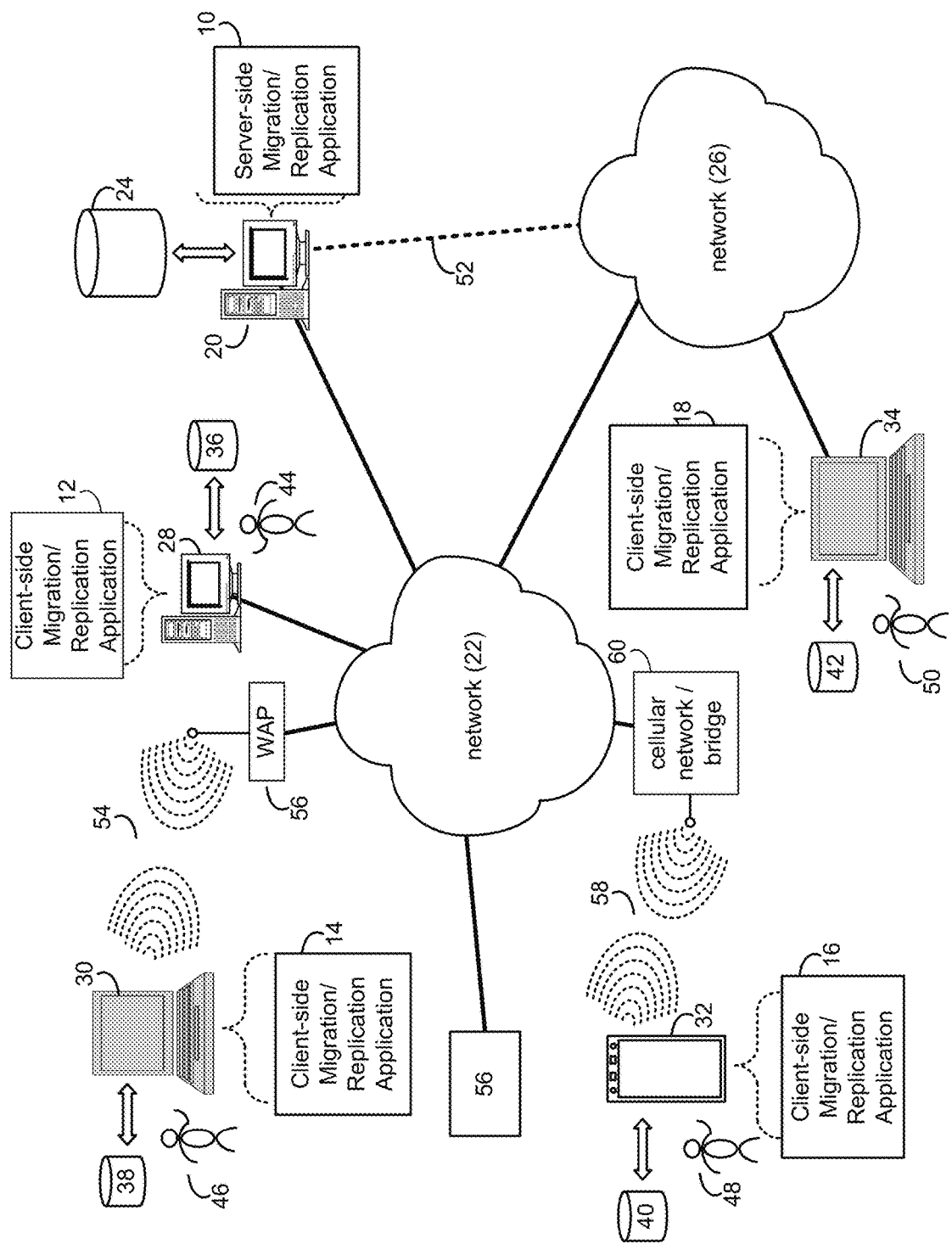
FIG. 1 illustrates an example system that can execute implementations of the present disclosure.

System administrators or end-users may desire to migrate or replicate computer systems under their administration. A computer system may comprise structures such as physical structures and software structures. For example, physical structures can include without limitation hard drives, memory, processors, storage devices, and other components. Similarly, software structures can include without limitation operating systems, disk drive partitions, applications, and/or data. A computer system may be a physical system, such as a desktop computer, an appliance such as a computer-enabled television, a laptop computer, a data-enabled mobile telephone, a notebook computer, a tablet, or a personal digital assistant, for example. A computer system may be a virtual system, such as a virtual emulation of a physical system, including the hard drives, memory, storage devices, operating system, disk drive partitions, applications, and data, for example.

A system administrator or end user may desire to migrate a physical or virtual computer system from one platform to another. System migration is the process of moving a computer system from one platform to another, where the either or both of the source and destination platforms may be physical or virtual, and/or may have an identical or dissimilar hardware and/or software configurations. Migration may move the operating system, applications, data, and possibly also the hard drive, data storage, and/or disk partition configuration of the source computer system, and avoids recreating the computer system from an uninitialized system.

A system administrator or end user may desire to replicate a physical or virtual computer system to another computer system. Replication is the process of creating one or more copies of a computer system, possibly including the operating system, applications, data, and possibly also the hard drive, data storage, and/or disk partition configuration of the source computer system. The destination computer system or systems may be physical or virtual, and may have the same or a different hardware and/or software configuration as the source computer system. A replication system may further require maintenance and synchronization of the copies of the replicated computer system, such that all copies of the computer system remain identical.

A computer system may be migrated and/or replicated for a variety of reasons. In some cases, the computer system may be migrated to move the computer system to a different platform, such as for instance an upgraded platform. In other cases, the computer system may be deployed to multiple computer systems to provide a uniform system for multiple users. In other cases, the computer system may need to be recovered after infection by a virus or crashing.

In some situations, migration and/or replication may involve migrating and/or replicating a physical computer system to another physical computer system.

Migrating/replicating a source computer system may include first configuring the physical hardware, including the hard drives, memory, storage devices, and/or processor or processors of the destination computer system. Alternatively, the source computer system may be migrated/replicated to a destination computer system with an established physical configuration. Migrating/replicating may further involve installing and configuring an operating system on the destination computer system, installing and configuring application software, and/or copying data from the source computer system to the destination computer system.

In some situations, migration and/or replication may involve migrating and/or replicating from or to a virtual environment, or from one virtual platform to another virtual platform. In some situations, the virtual platform may reside on a cloud-based computing system. Migrating/replicating from a virtual environment to a physical environment may comprise similar steps as when migrating/replicating from one physical system to another, described above. Migrating/replicating between virtual environments, however, may in some situations be limited to migrating/replicating between virtual platforms with identical configurations. Migrating/replicating to a virtual environment may involve creating an image of the source computer system and/or writing a program to gain access to the destination virtual platform. This program may require knowledge of and/or access to the application programming interface (API) of the destination virtual platform.

The system administrator or end user may additionally require credentials with high privileges in order to have sufficient access to the destination virtual platform to undertake these operations. Regardless of how the system administrator or end user gains access to the destination platform, migration/replication may require starting a virtual machine on the destination virtual system and copying the source computer system's data, such as for instance in the form of an image file, to the destination virtual system. In situations where the copying process is over a network, the copying may be interrupted by a network disconnection, necessitating starting the copying process from the beginning Once the copying is complete, the system administrator or end user may not have a means to validate the copy of the data, and or the migrated/replicated computer system.

Migrating and/or replicating to either a physical or virtual environment may also be accomplished by using bootable media. Bootable media comprises media, such as CDs, DVDs, floppy disks, tape drives, flash memory, and the like, with a bootable application on it. The bootable media can be attached to a computer system such that the computer system's boot process will run the bootable application on the bootable media. The bootable media may further contain applications for installing and configuring the software, such as operating systems and applications, on the computer system. The computer system, however, may need to be configured prior to booting the bootable media. For instance, a physical computer system's hard drives may need to be initialized and configured; similarly, a virtual computer system may need for a virtual machine to be started.

The systems and methods disclosed herein facilitate migration/replication between physical systems, between physical and virtual systems, and between virtual systems. Various embodiments disclosed herein provide automated methods for migrating/replicating between physical systems. Various embodiments also provide methods for accessing virtual systems without requiring the use of the API or special access credentials. Embodiments disclosed herein further provide methods to migrate/replicate between physical and virtual platforms with different configurations.

Referring to FIG. 1, there is shown a server application 10 for migrating and/or replicating a computer system, and client computer systems 28, 30, 32, 34. The server application 10 and/or one or more of the client computer systems 28, 30, 32, 34 may execute one or more of the processes configured to carry out one or more of the features described herein. The server application 10 may be referred to as a process configured to carry out one or more of the features descried herein, such as the migration/replication process 400, 500. Further, on or more of the client applications 12, 14, 16, and 18 may be referred to as a process configured to carry out one or more of the features described herein, such as the migration/replication process 400, 500 described with regard to FIGS. 6 and 7.

As will be discussed below and referring now to FIGS. 6 and 7, the migration/replication process or application 400, 500 may determine 410 a structure of a source computer system. The migration/replication process 400, 500 may further generate 412 an executable package comprising instructions for migrating and/or replicating the source computer system. The executable package may further comprise an executable agent and a list of tasks for the agent. The migration/replication process 400, 500 may further receive 510 an executable package and execute 512 the executable package in order to migrate and/or replicate the computer system on another physical or virtual computer system.

Figure 2:
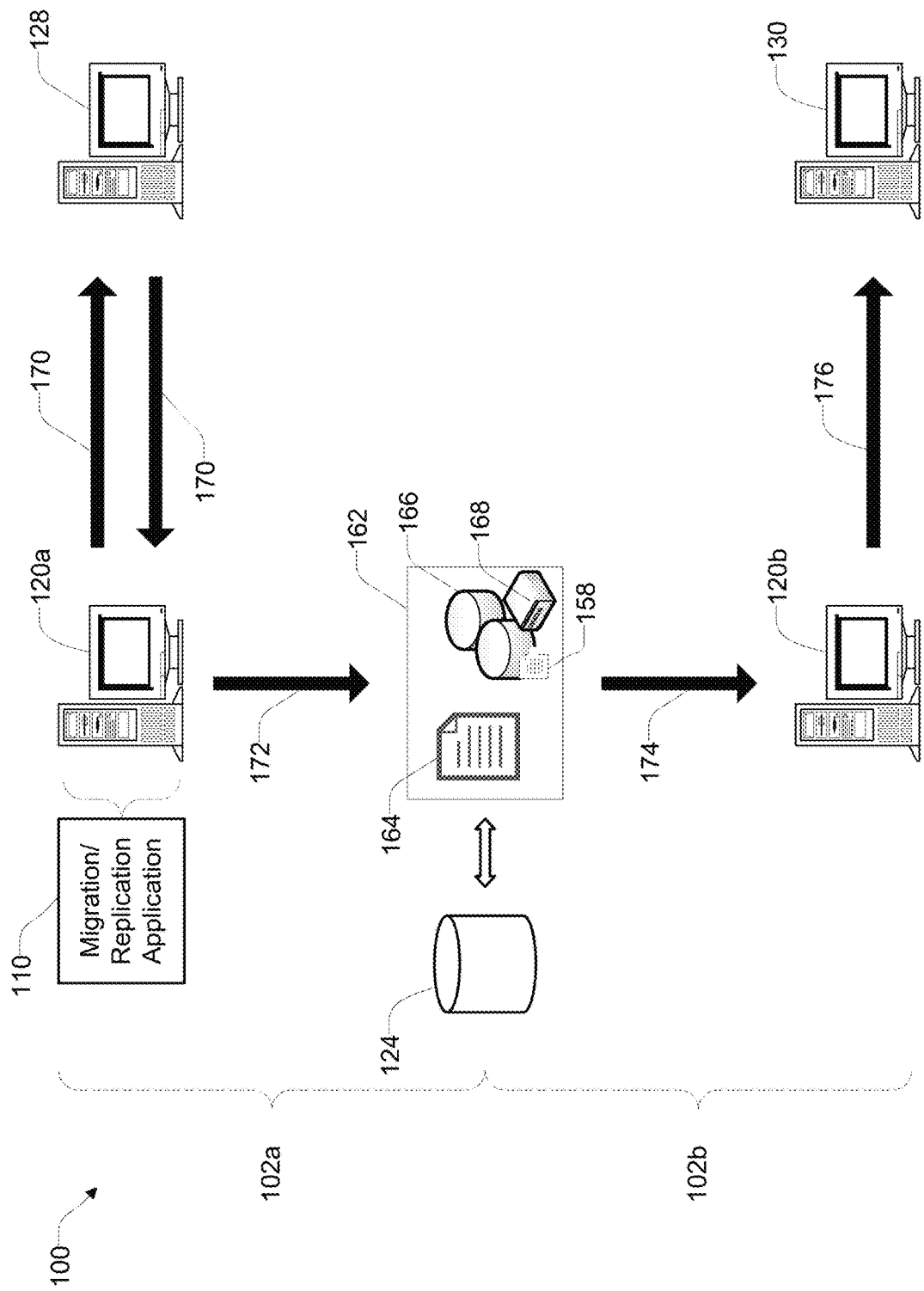
FIG. 2 illustrates a system for migrating and/or replicating a source computer system to a destination computer system, coordinated by one or more server computers.
Figure 3:
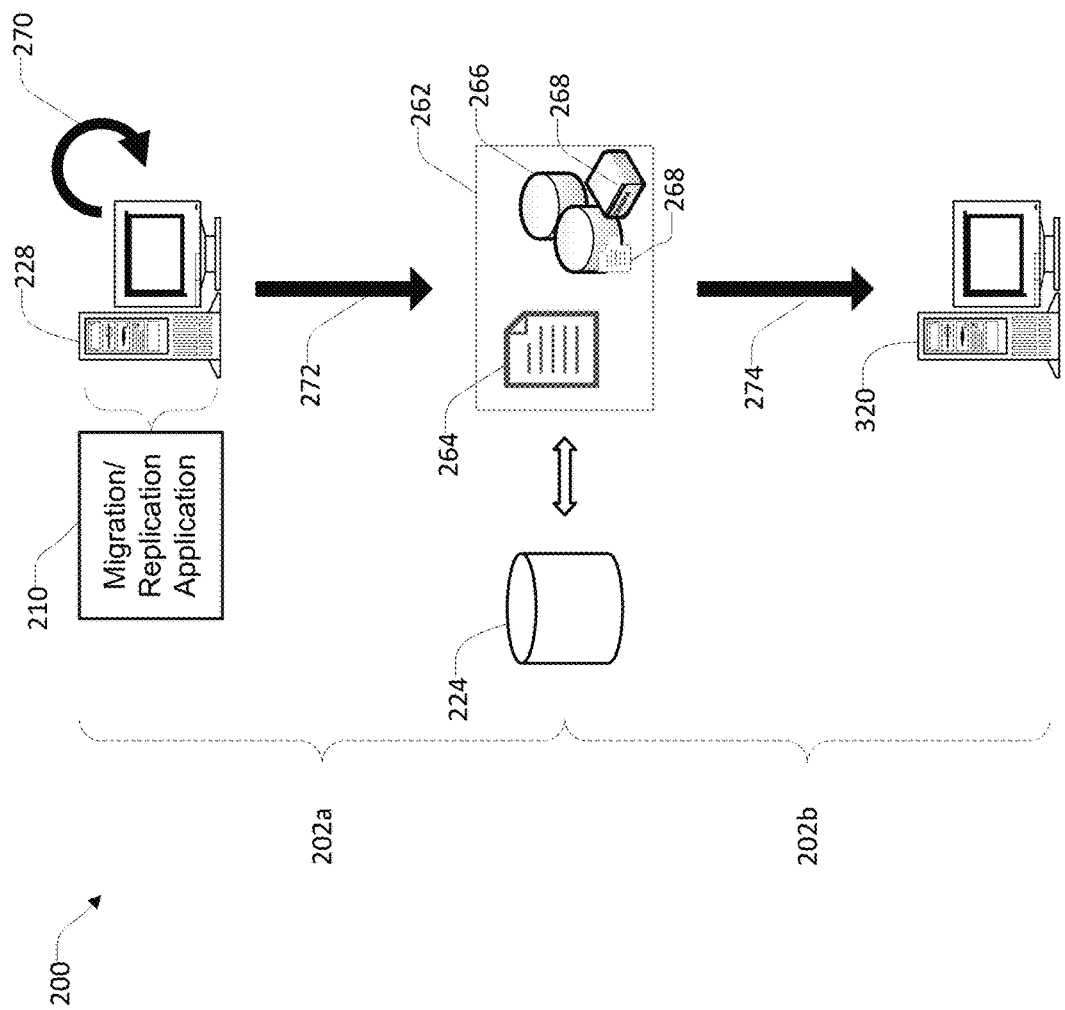
FIG. 3 illustrates a system for migrating and/or replicating a source computer system directly to a destination computer system.

With reference to FIGS. 2 and 3, the migration/replication process may be a server-side process (e.g., the server-side migration/replication process 102a-102b), a client-side process (e.g., the client-side migration/replication process 202a-202b), or a hybrid server-side/client-side process (e.g., a combination of the server-side process 102a-102b and the client-side process 202a-202b).

System Overview

Referring to FIG. 1, the server-side migration/restoration process 10 may reside and may be executed by a server computer 20, which may be in communication with a network 22 (e.g., the Internet or a local area network). Examples of the server computer 20 include, but are not limited to: a personal computer, a server computer, a series of server computers, a mini computer, and/or a mainframe computer. The server computer 20 may be a distributed system and the operations of the server computer 20 may execute on one or more processors, simultaneously and/or serially. For example, the server computer 20 may be a cloud computing site, cloud environment, or cloud platform running multiple servers, computers, and/or virtual machines (e.g., a virtual machine host computer). The server computer 20 may execute on or more operating systems, examples of which may include but are not limited to Microsoft Windows Server™, Novell Netware™, Redhat Linux™, Unix, or a custom operating system, for example.

The instruction sets and subroutines of the server-side migration/replication process 10, which may be stored on a storage device 24 coupled to the server computer 20, may be executed by one or more processors (not shown) and one or more memory architectures (not shown) incorporated into the server computer 20. The storage device 24 may include but is not limited to: a hard disk drive; a tape drive; an optical drive; a solid state storage device; a RAID array; a random access memory (RAM); and a read-only memory (ROM).

The server computer 20 may execute a web server application that allows for access to the server computer 20 (via the network 22) using one or more protocols, examples of which may include but are not limited to HTTP (i.e., HyperText Transfer Protocol). The network 22 may be in communication with one or more secondary networks (e.g., a secondary network 26), examples of which may include but are not limited to: a local area network; a wide area network; or an intranet, for example.

The client-side migration/replication processes 12, 14, 16, 18 may reside on and may be executed by client electronic devices 28, 30, 32, 34 (respectively), examples of which may include but are not limited to a personal computer 28, a television with one or more processors embedded therein or coupled thereto (not shown), a laptop computer 30, a data-enabled mobile telephone 32, a notebook computer 34, a tablet (not shown), and a personal digital assistant (not shown), for example. Client electronic devices 28, 30, 32, 34 may each be in communication with the network 22 and/or secondary network 26 and may each execute an operating system, examples of which may include but are not limited to Apple iOS™, Microsoft Windows™, Android™, Redhat Linux™, or a custom operating system.

The instruction sets and subroutines of the client-side migration/replication processes 12, 14, 16, 18, which may be stored on storage devices 36, 38, 40, 42 (respectively) coupled to the client electronic devices 28, 30, 32, 34 (respectively), may be executed by one or more processors (not shown) and one or more memory architectures (not shown) incorporated into the client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage device, for example.

The client-side migration/replication processes 12, 14, 16, 18 and/or server-side migration/replication process 10 may be processes that run within (i.e., are part of) a cloud computing site, cloud computing application, cloud platform, or cloud environment. Alternatively, the client-side migration/replication processes 12, 14, 16, 18 and/or server-side migration/restoration process 10 may be stand-alone applications that work in conjunction with the cloud computing site, cloud computing application, cloud platform, or cloud environment. One or more of the client-side migration/replication processes 12, 14, 16, 18 and server-side migration/replication process 10 may interface with each other (via the network 22 and/or secondary network 26).

Users 44, 46, 48, 50 may access the server-side file migration/replication process 10 directly through the device on which the client-side migration/replication process (e.g., client-side migration/replication processes 12, 14, 16, 18) is executed, namely the client electronic devices 28, 30, 32, 34, for example. Users 44, 46, 48, 50 may access the server-side migration/replication process 10 directly through the network 22 and/or through the secondary network 26. Further, the server computer 20 (i.e., the computer that executes server-side migration/replication process 10) may be in communication with the network 22 through the secondary network 26, as illustrated by the phantom link 52.

The various client electronic devices may be directly or indirectly coupled to the network 22 (or the secondary network 26). For example, the personal computer 28 is shown directly coupled to the network 22 via a hardwired network connection. Further, the notebook computer 34 is shown directly coupled to the network 26 via a hardwired network connection. The laptop computer 30 is shown wirelessly coupled to the network 22 via a wireless communication channel 54 established between the laptop computer 30 and a wireless access point (i.e., WAP) 56, which is shown directly coupled to the network 22. The WAP 56 may be, for example, an IEEE 802.11a, 802.11b, 802.11g, 802.11n, Wi-Fi, and/or Bluetooth device that is capable of establishing a wireless communication channel 54 between the laptop computer 30 and the WAP 56. A data-enabled mobile telephone 32 is shown wirelessly coupled to the network 22 via a wireless communication channel 58 established between the data-enabled mobile telephone 32 and a cellular network/bridge 60, which is shown directly coupled to the network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Migration/Replication Process

For the following discussion, the server-side migration/replication process 10 will be described for illustrative purposes, and the server computer 20 may run the serve-side migration-replication application 10 to carry out some or all of the techniques and features described here. It should be noted that the server-side migration/replication process 10 may interact with the client-side migration/replication process 12 and may be executed within one or more applications that allow for communication with the client-side migration/replication process 12. However, this is not intended to be a limitation of this disclosure, as other configurations are possible (e.g., stand-alone, client-side migration/replication processes and/or stand-alone server-side migration/replication processes). For example, some implementations may include one or more of the client-side migration/replication processes 12, 14, 16, 18 in place of or in addition to the server-side migration/replication process 10.

The systems and methods (e.g., the migration/replication process 10) described herein relate to the migration and/or replication of physical or virtual machines and/or physical or virtual machine files. In part, the systems and methods relate to simplifying and/or automating the migration and/or replication of physical or virtual machines and/or physical or virtual machine files and, more specifically, overcoming the differences between different computer and/or virtual machine computer systems.

The systems described herein may include on or more memory elements for migration and/or replication of software, databases, and physical or virtual machines, and computer storage products including instructions to be executed by a processor to cause the processor to implement the methods described herein.

Referring now to FIG. 1, one or more users 44, 46, 48, 50 may be system administrators or cloud administrators, or may be system or cloud end users. The system administrators may access and administer various client electronic devices 28, 30, 32, 34, through one or more of the server computer 20 or the client electronic devices 28, 30, 32, 34. Referring now to FIG. 2, in an embodiment, a system 100 for migrating and/or replicating a computer system is disclosed. A computer system 128 (e.g., client electronic devices 28, 30, 32, 34) may be a physical computer or virtualization host device. The virtualization host device may include a virtual machine and may run a cloud or virtualization application such as VMWare™ or may include a bare-metal embedded hypervisor (e.g., VMWare™ ESX™ and VMWare™ ESXi™). Further, the virtualization host device may include a vCloud™ architecture that may enhance cooperation between hypervisors. The migration/replication process 102a-102b may include or may work in connection with an agent 168 (e.g., a software module), which may include or may be configured to perform any number of the techniques or features described herein.

The migration/replication process 102a-102b may include a software component, executable code, function, subroutine, or other set of instructions designed to carry out one or more operations for migration/replication. The migration/replication process 102a-102b may coordinate the migration and/or replication of a computer system and, in an embodiment, may require a separate machine 120a, 120b where it can be run. This machine may be, for example, a virtual appliance, a Windows/Linux virtual machine, or a Windows/Linux physical machine, where the executable code of the migration/replication process 102a-102b can be executed.

In various embodiments, the migration/replication system 100 may include a process 102a for generating an executable package 162 for migrating/replicating a source computer system 128. The executable package 162 can include a template or a virtual machine seen file that will serve as the basis for replicating a virtual machine on another platform. The process 102a for generating the executable package 162 may be a server-side application 110, executed by a first server computer 120a. The first server computer 120a is able to communicate with, and may have full access to, the source computer system 128. The source computer system 128 may be a physical or virtual system. The process 102a for generating the executable package 162 comprises determining 170 the structure of the source computer system 128. For example, in order to migrate a virtual machine to another platform such as a cloud computing platform, software to create the migrated virtual machine on the target platform and transfer data to it is required. Such software can be a template or other executable package 162 that includes information about the structure of the machine that is being migrated to a target platform.

The structure of the source computer system 128 may include the physical configuration of any hard drives, memory, storage devices, and/or processors. The structure of the source computer system 128 may include the software configuration, include operating systems, operating system configurations, disk partitions, applications, application configurations, and/or data. Having determined 170 one or more structures of the source computer system 128, the process 102a for generating the executable package 162 may generate instructions 164 for migrating and/or replicating the source computer system 128, and package 172 those instructions 164 in an executable package 162.

The executable package 162 is a standalone application that can be executed by a boot process, operating system, and/or another application. The executable package 162 may be platform independent, meaning that it can be executed by any computer system regardless of the hardware or software configuration. The executable package 162 may comprise instructions 164 for migrating and/or replicating the source computer system 128, such as for instance the configuration 166 of any of the source computer system's 128 physical disks or other structures associated with that system 128. The executable package 162 may further comprise various executable agents 168 and agent task lists 158. The executable package 162 may be stored on a storage device 124 directly attached to the first server computer 120a, or attached to the first server computer 120a over a network.

In various embodiments, the migration/replication process 102a-102b may include a process 102b for executing the executable package 162. The process 102b for executing the executable package 162 may be executed by a second server computer 120b. Though illustrated separately, it is understood that the second server system 120b may be the same entity as the first server system 120a. The second server computer 120b is able to communicate with, and may have full access to, the destination computer system 130. The destination computer system 130 may be a physical or a virtual computer system. Alternatively or additionally, the destination computer system 130 may be a cloud-based environment.

In the process 102b for executing the executable package 162, the second server computer 120b may receive 174 the executable package 162, either from a directly attached storage device 124 or over a network connection, for example. The second server computer 120b may transmit 176 the executable package 162 to the destination computer system 130. The destination computer system 130 may subsequently execute the executable package 162, possibly within a boot process, an existing operating system, an existing application, or within a virtual environment.

Upon being executed, the instructions 164 for migrating and/or replicating the source computer system 128 will be executed. The instructions 164 may include instructions, for example, for configuring physical disks, configuring virtual disks, configuring virtual disks of physical disks, starting a virtual machine, configuring disk partitions, initializing and configuring an operating system, and/or installing and configuring applications, in any combination and in any order.

In one embodiment, the instructions 164 may configure the destination computer system 130, such that the source computer system 128 is migrated and/or replicated to the destination computer system 130. Alternatively or additionally, the instructions 164 may migrate/replicate the source computer system 128 on a subsystem of the destination computer system 130, such as on a disk partition or in a virtual environment. The instructions 164 may further comprise instructions for locating and copying data files present on the source computer system 128. The data files may reside on the source computer system 128 or may be located elsewhere, such as on a network-attached storage device. The instructions 164 may further comprise instructions for rebooting the migrated/replicated computer system and/or the destination computer system 130.

The executable package 162 may further include an executable agent 168 and a task list 158 for the agent 168. The agent 168 is an application, such as a Unified Extensible Firmware Interface (UEFI) program, or a boot loader program that starts when the destination computer system 130 is booted. The agent 168 may be executed subsequent or prior to the executing of the instructions 164 for migrating/replicating the source computer system 128. In situations where the executable package 162 comprises a bootable operating system, the agent 168 may be a program than can be run from within that operating system. Upon being executed, the agent 168 executes the task list 158. The task list 158 may comprise tasks for locating and copying data files present on the source computer system 128. The task list 158 may further comprise other tasks, such as rebooting the migrated/replicated computer system.

As discussed above, the migration/replication process may be a server-side process or a client-side process. FIG. 2 illustrates a system 100 for a server-side process 102a-102b. FIG. 3 illustrates a system 200 for a client-side process 202a-202b. The server-side process 102a-102b and the client-side process 202a-202b are illustrated separately only for the sake of clarity; it is understood that the migration/replication process may be a hybrid server-side/client-side process. As such, the process 102a, 202a for generating the executable package may be performed by either the server computer or the client computer. Similarly, the process 102b, 202b for executing the executable package may be directed by a server computer, or may be executed directly by a client computer.

Referring now to FIG. 3, the migration/replication system 200 may include a process 202a for generating an executable package 262 for migrating/replicating a source computer system 228. The process 202a for generating the executable package 262 may be a client-side application 210 executed by the source computer system 228. The source computer system 228 may be a physical or virtual system. The process 202a for generating the executable package 262 comprises determining 270 the structure of the source computer system 228. The structure of the source computer system 228 may include the physical configuration of any hard drives, memory, storage devices, and/or processors, and the software configuration, include operating systems, operating system configurations, disk partitions, applications, application configurations, and/or data. Having determined 270 the structure of the source computer system 228, the process 202a for generating the executable package 262 may generate instructions 264 for migrating and/or replicating the source computer system 228, and package 272 those instructions 264 in an executable package 262.

The executable package 262 may comprise instructions 264 for migrating and/or replicating the source computer system 228, such as for instance the configuration 266 of the source computer system's 128 physical disks. The executable package 262 may further comprise various executable agents 268 and agent task lists 258. The executable package 262 may be stored on a storage device 224 directly attached to the source computer system 228, or attached to the source computer system 228 over a network.

In various embodiments, the migration/replication system 200 may include a process 202b for executing the executable package 262. The process 202b for executing the executable package 262 may be executed by the destination computer system 230. The destination computer system 230 may be a physical or a virtual system. Alternatively or additionally, the destination computer system 230 may be a cloud-based environment. In the process 202b for executing the executable package 262, the destination computer system 230 may receive 274 the executable package 262, either from a directly attached storage device 224 or over a network connection, for example.

The destination computer system 230 may execute the executable package 262, possibly within a boot process, an existing operating system, an existing application, or within a virtual environment. Upon being executed, the instructions 264 for migrating/replicating the source computer system 228 will be executed. The instructions 264 may include instruction, for example, for configuring physical disks, configuring virtual disks, configuring virtual disks of physical disks, starting a virtual machine, configuring disk partitions, initializing and configuring an operating system, and/or installing and configuring applications, in any combination and in any order. The instructions 264 may configure the destination computer system 230, such that the source computer system 228 is migrated and/or replicated on the destination computer system 230.

Alternatively or additionally, the instructions 264 may migrate/replicate the source computer system 228 on a subsystem of the destination computer system 230, such as on a disk partition or in a virtual environment. The instructions 264 may further comprise instructions for locating and copying data files present on the source computer system 228. The instructions 264 may further comprise instructions for rebooting the migrated/replicated computer system and/or the destination computer system 230.

The executable package 262 may further include an executable agent 268 and a task list 258 for the agent 268. The agent 168 may be executed subsequent or prior to the executing of the instructions 264 for migrating/replicating the source computer system 228. Upon being executed, the agent 268 executes the task list 258. The task list 258 may comprise tasks for locating and copying data files present on the source computer system 228. The task list 258 may further comprise other tasks, such as rebooting the migrated/replicated computer system.

In some situations, a backup or image of a source computer system may exist. The image comprises similar information and instructions as can be found in the executable package 162, 262, described above, such as the configuration of any hard drives, memory, storage devices, processors, operating systems, applications, and/or data as given when the image was created. The image may itself be executable.

Figure 4:
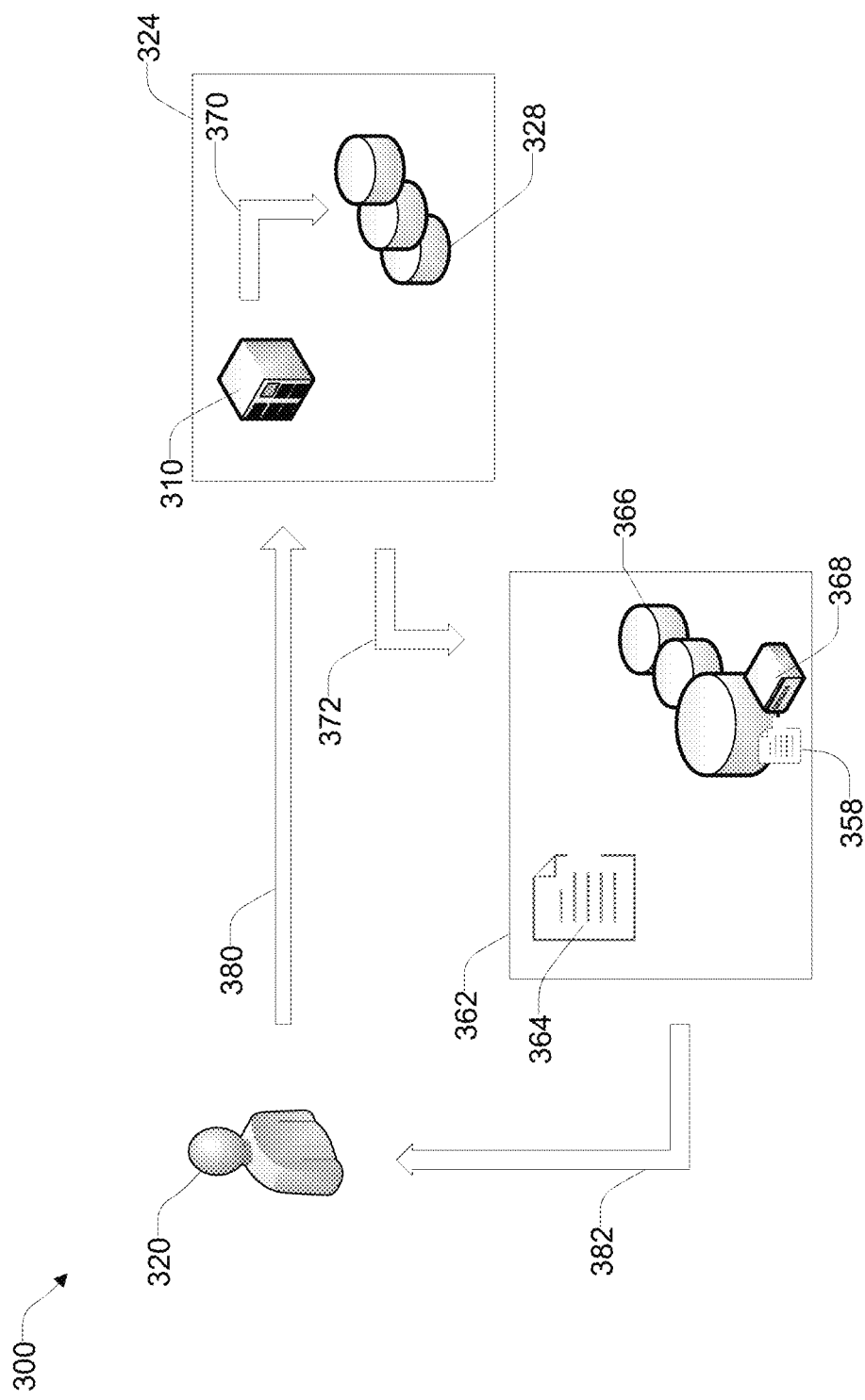
FIG. 4 illustrates generating an executable package for migrating and/or replicating a computer system from an image of the computer system.

FIG. 4 illustrates an example of a migration/replication process 300 employing images of computer systems. As illustrated in FIG. 4, a plurality of images 328 may be stored on a storage device 324, where each image 328 represents a different computer system or the same computer system at different times. A user 320 can select an image 328 for migration and/or replication and request 380 that the selected image 328 be packaged 372 for migration/replication. It is understood that the selection of images and request 380 for executable packages can be performed without the intervention of a user, such as for instance by an automated process.

An application 310 running on the storage device 324 or on a server capable of reading from and writing to the storage device 324 determines 370 the structure of the selected image 328. As explained above, the image 328 comprises a description of either a physical or a virtual computing system; the application 310 can read the image 328 and generate instructions 364 to migrate/replicate the computer system described by the image 328. In some situations, the instructions 364 may be in the form of a template, such as for example an Open Virtualization Format (OVF) template, or the template may be written another portable format, such as in Extensible Markup Language (XML). The application 310 will package 372 the instructions 364 in an executable package 362, with an executable agent 368 and task list 358 for the agent 368. The executable package 362 may comprise other information, such as the virtual and/or physical hard drive configuration 366 of the computer system described by the selected image 328. The executable package 362 may be delivered 382 to the user who requested it. The template can also be a Preboot eXecution Environment (PXE) file or package.

Figure 5:
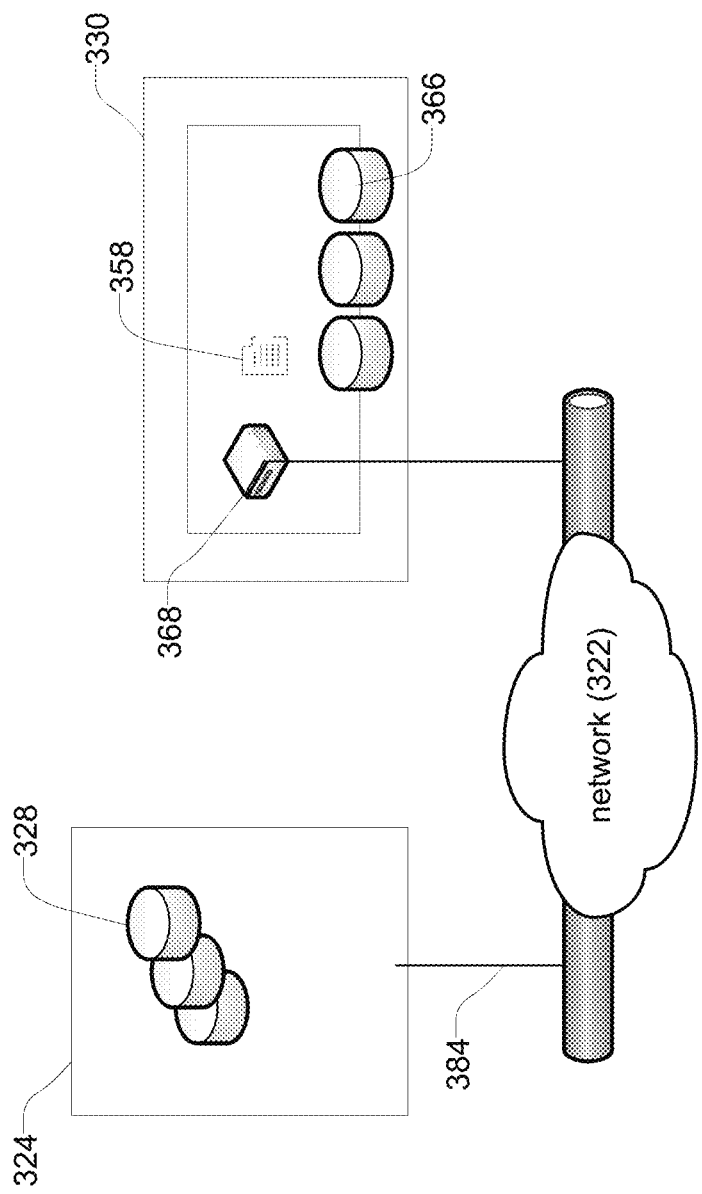
FIG. 5 illustrates delivering an executable package to a destination computer system.

FIG. 5. illustrates how the executable package 362 can be used to migrate and/or replicate the computer system described by the selected image 328. As illustrated, the storage device 324 that houses the computer system images 328 may be connected to a network 322. The executable package 362 may be transmitted 384 from the storage device 324 to the destination platform 330. The executable package 362 may be uploaded to the destination platform 330 using the interface provided by the destination platform 330; for instance, if the destination platform is a VMWare environment, the executable package 362 may be uploaded using a vSphere client. The executable package 362 may then be executed by the destination platform 330, which may cause the instructions 364 within the executable package 362 to be run. The instructions 364 may configure a destination computer system, which may comprise configuring the destination platform 330 itself, or starting and configuring a virtual machine system.

The agent 368 may be registered as a boot loader, and thus may be executed by the BIOS or UEFI of the destination computer system. The agent 368 will read and execute the task list 358. The task list 358 may comprise tasks to, for example, copy data from the image 328 to migrated/replicated disks 366. This task may include information about the location of the image 328, credentials to access the image, a mapping of the disks described in the image 328 versus the disks 366 configured on the destination platform 330, and/or some additional parameters related to executing this task, such as a reattempt configuration in the case of network disconnections. The task list 358 may further comprise tasks to recover the migrated/replicated operating, such as fixing boot chains and adding drivers for para-virtual devices. The agent 368 may also validate the migrated/replicated file system, and reboot the destination computer system, such that the destination computer system is restarted with the migrated/replicated operating system.

Figure 6:
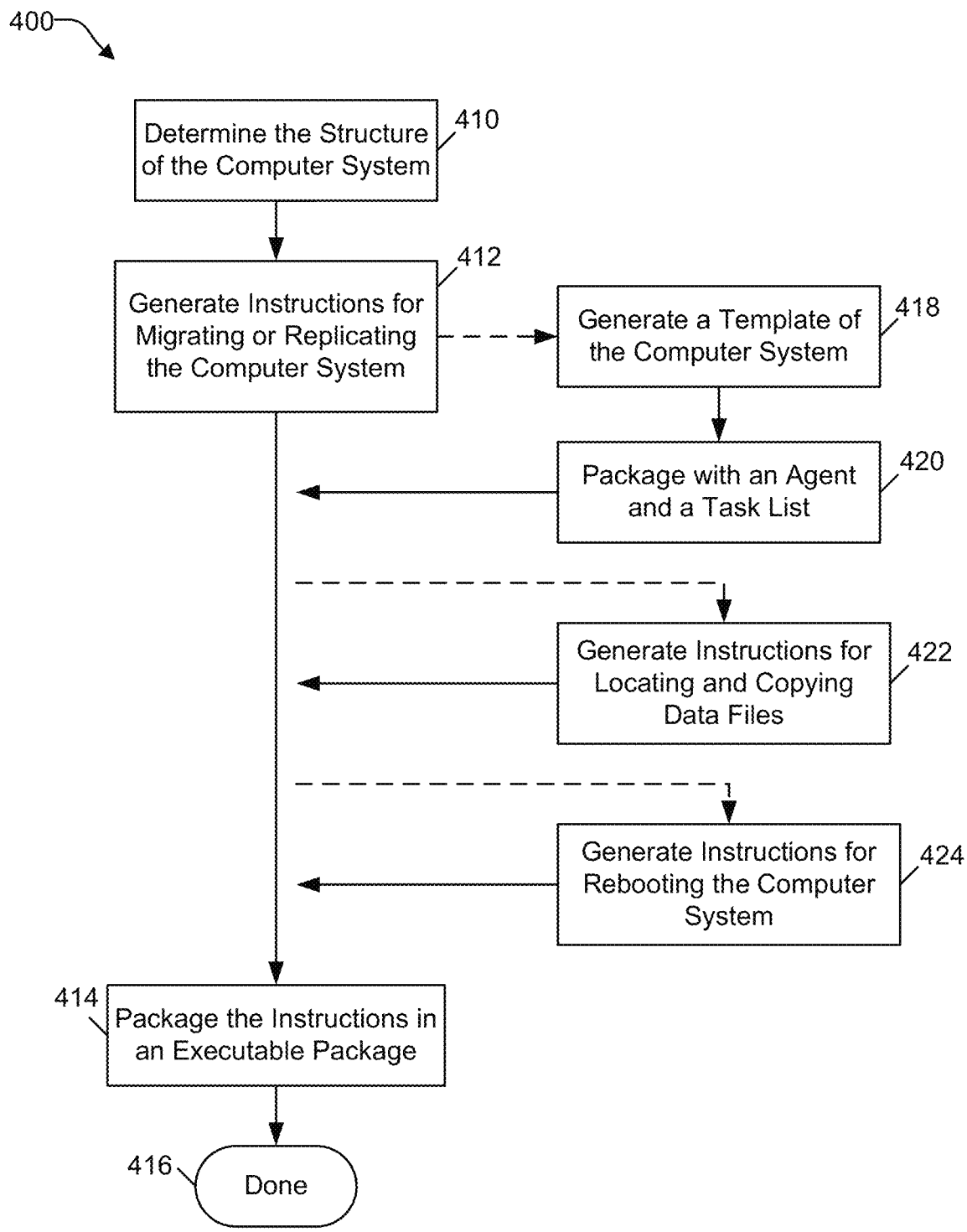
FIG. 6 illustrates a process for generating an executable package for migrating and/or replicating a computer system.

FIG. 6 illustrates one embodiment of a migration/replication process 400 for generating the executable package disclosed by FIGS. 2-4. The migration/replication process 400 may be executed by a server computer and/or a client computer or a combination thereof; for simplicity, the system executing the migration/replication process 400 will hereinafter be referred to as the executing computer. As illustrated in FIG. 6, the executing computer determines 410 the structure of source the computer system that is to be migrated and/or replicated. The executing computer further generates 412 instructions for migrating/replicating the source computer system.

In one embodiment, the instructions may optionally be formatted as a template 418 of the source computer system, packaged 420 with an executable agent and task list. The instructions may optionally include instructions for locating and copying data files 422 present on the source computer system. The instructions for locating and copying data files 422 may alternatively be in the form of tasks for the agent. The instructions may optionally include instructions for rebooting 424 the destination computer system. The instructions for rebooting 424 may alternatively be in the form of tasks for the agent. The generated instructions (and possibly the agent and task list) are packaged 414 by the executing computer in an executable package to complete 416 the process for generating an executable package.

Figure 7:
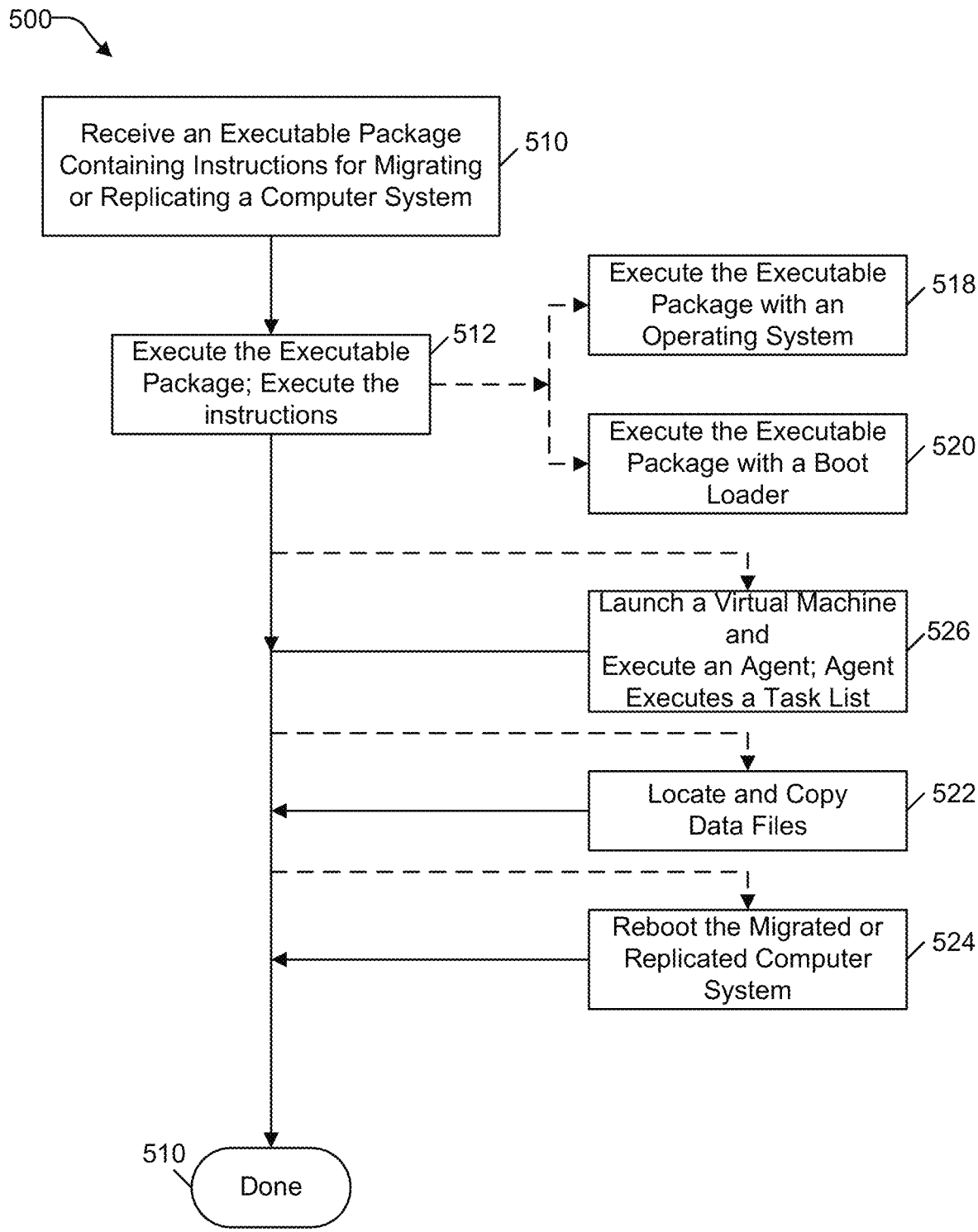
FIG. 7 illustrates a process for executing an executable package for migrating and/or replicating a computer system.

FIG. 7 illustrates one embodiment of a migration/replication process 500 for executing the executable package disclosed by FIGS. 2-4. The migration/replication process 500 may be executed by a server computer and/or a client computer or a combination therefor for simplicity hereinafter referred to as the executing computer. As illustrated in FIG. 7, the executing computer receives 510 an executable package containing instructions for migrating/replicating a source computer system. The executing computer may execute 512 the executable package, thereby causing the instructions to be executed. The executing computer may execute the executable package within an existing operating system 518 or through a boot process 520. The instructions contained within the executable package may include instructions to launch a virtual machine 526; for instance, the instructions may be formatted as a template, describing the configuration of the source computer system and the steps necessary to configure a destination computer system.

In one embodiment, the executable package may further comprise an agent, which may be executed by the executing computer's boot process, and/or by the executing computer's operating system, and/or by an operating system initiated by the executable package's instructions. The agent may execute a task list to execute tasks for further migrating/replicating the source computer system. The instructions executed by the executable package may further contain instructions for locating and copying data files 522 present on the source computer system. The instructions for locating and copying the data files may be in the form of tasks for the agent. The instructions may further include instructions for rebooting 524 the migrated/replicated computer system, such that the migrated/replicated computer system is restarted with any migrated/replicated operating system. Once all the instructions and/or tasks have been complete, the process is complete 516.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computer system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computer system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A computer-implemented method for preparing a computer system for automated migration or replication to a destination computer system, comprising:
   determining, by a processor, the structure of the computer system;
   generating, by the processor, a first set of instructions for migrating or replicating the structure of the computer system, wherein the structure of the computer system comprises a physical configuration of the computer system and a software configuration of the computer system;
   generating, by the processor, a second set of instructions for locating and copying data files from the computer system;
   packaging, by the processor, the first set of instructions and the second set of instructions in an executable package, wherein execution of the executable package at the destination computer system initiates automated migration or replication;
   uploading, the executable package to the destination computer system using import functionality of the destination computer system;
   deploying a migration agent in the executable package, without requiring an API or special access credentials to perform deployment, wherein the migration agent is registered as a boot loader executable by the destination computer system, wherein the agent is an executable application;
   executing, by the destination computer system, the executable package, wherein the executable package causes each of the instructions of the first set of instructions to be executed, wherein the destination computer system causes the migration agent to be executed, wherein the migration agent causes at least the second set of instructions to be executed; and
   establishing a network connection to a specified storage using certificate or credentials specified in the second set of instructions.

2. The method of claim 1, wherein the second set of instructions comprise a template of the computer system and the template is packaged with the migration agent and a task list, wherein the migration agent automates the replication or migration upon execution of the executable package.

3. The method of claim 2, wherein the template is an Open Virtualization Format (OVF) template or a Preboot eXecution Environment (PXE) package and wherein replication or migration is performed without using migration or replication application programming interface of the destination computer system.

4. The method of claim 2, wherein the task list comprises one or more instructions for reattempting migration or replication process in the event of a loss of network connection between the computer system and the destination computer system.

5. The method of claim 2, wherein the task list comprises instructions for rebooting the destination computer system to bring a migrated virtual machine from the computer system online.

6. The method of claim 2, wherein the task list includes at least one of a hostname, a port, credentials, and a certificate of access for an image storage.

7. A computer-implemented method for migrating or replicating a computer system to a destination computer system, comprising:
   uploading an executable package to a destination computer system using import functionality of destination computer system;
   receiving, by a processor, an executable package containing a migration agent and a first set of instructions for locating and copying data files from the computer system, wherein the migration agent is registered as a boot loader executable by the destination computer system; and
   executing, by the processor, the executable package, wherein the destination computer system causes the migration agent to be executed, wherein the migration agent causes each of the instructions of the first set of instructions to be executed, wherein execution of the executable package at the destination computer system initiates automated migration or replication, without requiring an API or special access credentials to perform migration or replication; and
   establishing a network connection to a specified storage using certificate or credentials specified in the executable package.

8. The method of claim 7, wherein the executable package is executed by an operating system of destination computer system.

9. The method of claim 7, wherein and wherein replication or migration is performed without using migration or replication application programming interface of the destination computer system.

10. The method of claim 7, wherein the instructions comprise a template of the computer system, and the executable package includes a task list, wherein the migration agent performs task on the task list.

11. The method of claim 10, wherein the template is an Open Virtualization Format (OVF) template or a Preboot eXecution Environment (PXE) package.

12. The method of claim 10, further comprising
   launching, by the processor, a virtual machine according to the template of the computer system; and
   executing, by the processor, the migration agent, wherein the migration agent executes the task list.

13. The method of claim 12, wherein the task list comprises tasks for locating and copying data files from the computer system.

14. The method of claim 12, wherein the task list comprises tasks for rebooting the destination computer system.

15. The method of 7, further comprising:
   mapping disk partitions from an image of the computer system to a target machine.

16. A system for migrating or replicating a computer system comprising:
   a first computer system, configured to:
   determine the structure of a third computer system;
   generate a first set of instructions for migrating or replicating the structure of the third computer system;
   generate a second set of instructions, wherein the second set of instructions comprise instructions for locating and copying data files from the third computer system; and
   package the first set and the second set of instructions in an executable package;
   upload, the executable package to a second computer system using import functionality of destination computer system;

deploy a migration agent in the executable package, without requiring an API or special access credentials to perform deployment, wherein the migration agent is registered as a boot loader executable by the second computer system;

and the second computer system, configured to:

receive the executable package;

execute the executable package, wherein the executable package causes each of the first set of instructions to be executed, wherein the second computer system causes the migration agent to be executed, wherein the migration agent causes at least the second set of instructions to be executed wherein execution of the executable package at the second computer system initiates automated migration or replication; and establishing a network connection to a specified storage using certificate or credentials specified in the second set of instructions.

17. The system of claim 16, wherein the second computer system executes the executable package through an operating system.

18. The system of claim 16, wherein the second computer system initiates replication or migration without using migration or replication application programming interface of the second computer system.

19. The system of claim 16, wherein the instructions comprise a template of the computer system, and a task list, wherein the migration agent automates the replication or migration upon execution of the executable package.

20. The system of claim 19, wherein the second computer system is further configured to:

launch a virtual machine according to the template of the third computer system; and execute the migration agent, wherein the migration agent executes the task list.

21. The system of claim 20, wherein the task list comprises tasks for reattempting migration or replication process in the event of a loss of network connection between the second computer system and the third computer system.

22. The system of claim 20, wherein the task list comprises tasks for rebooting the destination computer system.

* * * * *